United States Patent
Ogawa

(10) Patent No.: US 8,593,539 B2
(45) Date of Patent: Nov. 26, 2013

(54) IMAGE PROCESSING APPARATUS AND IMAGE PROCESSING METHOD FOR PERFORMANCE WHITE BALANCE PROCESSING

(75) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 13/087,791

(22) Filed: Apr. 15, 2011

(65) Prior Publication Data

US 2011/0273584 A1 Nov. 10, 2011

(30) Foreign Application Priority Data

May 10, 2010 (JP) ................................. 2010-108679

(51) Int. Cl.
*H04N 9/73* (2006.01)
(52) U.S. Cl.
USPC ...................................................... 348/223.1
(58) Field of Classification Search
USPC ...................................................... 348/223.1
See application file for complete search history.

(56) References Cited

U.S. PATENT DOCUMENTS

2003/0189650 A1* 10/2003 Gindele et al. ............. 348/223.1
2008/0100702 A1* 5/2008 Tannai ............................ 348/65
2009/0219408 A1* 9/2009 Takemoto ................... 348/223.1
2009/0225186 A1* 9/2009 Kurokawa ................... 348/222.1
2010/0026835 A1* 2/2010 Negishi et al. ............. 348/223.1
2010/0231746 A1* 9/2010 Nomura ..................... 348/223.1

FOREIGN PATENT DOCUMENTS

| EP | 1 351 524 A2 | 10/2003 |
|---|---|---|
| JP | 10-271519 | 10/1998 |
| JP | 11-194390 | 7/1999 |
| JP | 2008-263492 | 10/2008 |

OTHER PUBLICATIONS

The above reference was cited in a Jul. 9, 2013 Chinese Office Action, a copy of which is enclosed with an English Translation, that issued in Chinese Patent Application No. 201110120255.8.

* cited by examiner

*Primary Examiner* — James M Hannett
*Assistant Examiner* — Fayez Bhuiyan
(74) *Attorney, Agent, or Firm* — Cowan, Liebowitz & Latman, P.C.

(57) ABSTRACT

Disclosed is an image processing apparatus capable of effectively correcting color crosstalk in moving image capturing by a simple method, and a control method thereof. When the aperture value changes, the current white balance coefficient is corrected, calculating an estimated white balance coefficient corresponding to the changed aperture value. Re-obtainment of a white balance coefficient starts using a frame image captured at the changed aperture value. During a period required to obtain again a white balance coefficient, the estimated white balance coefficient is applied to a frame image to undergo white balance processing.

3 Claims, 7 Drawing Sheets

IMAGE PROCESSING APPARATUS AND IMAGE PROCESSING METHOD FOR PERFORMANCE WHITE BALANCE PROCESSING

BACKGROUND OF THE INVENTION

1. Field of the Invention

The present invention relates to an image processing apparatus and an image processing method and, more particularly, to an image processing apparatus for suppressing color crosstalk in an image sensed by an image sensor, and a control method thereof.

2. Description of the Related Art

An image sensor mounted in an image-capturing apparatus such as a digital camera has an arrangement in which pixels each having a photoelectric conversion element are arrayed in a matrix. The image sensor converts an object image formed by an optical system into an electrical signal for each pixel. A problem in the image sensor having this arrangement is "color crosstalk" generated when obliquely incident light enters not only a predetermined pixel but also an adjacent pixel.

The degree of color crosstalk changes depending on the pixel color (color of a color filter arranged in a pixel). Color crosstalk becomes large in a pixel of another color adjacent to a color filter of a high-transmittance color (generally green). For example, in an image sensor having color filters of a general Bayer array, color crosstalk caused by light which obliquely enters a green pixel out of red, green, and blue pixels, passes through the green color filter, and then enters an adjacent blue or red pixel becomes relatively large. The color crosstalk relatively increases the sensitivity of a blue or red pixel adjacent to a green pixel with respect to the green wavelength, and relatively decreases that of a green pixel.

As a technique for canceling color crosstalk, Japanese Patent Laid-Open No. 10-271519 discloses a technique of storing a correction coefficient determined based on the color crosstalk component, and correcting, using the correction coefficient, a color crosstalk component contained in an image signal output from an image sensor.

Japanese Patent Laid-Open No. 2008-263492 discloses a technique of estimating the change amount of the F-number upon a zoom lens focal length (angle of view) change operation, and controlling the shutter speed and frame rate, thereby preventing overexposure or underexposure when a zoom operation is done during moving image capturing.

Japanese Patent Laid-Open No. 11-194390 discloses a technique of enabling fine light quantity adjustment by a combination of stop driving using a stepping motor and electronic shutter speed control in a video camera or the like without increasing the number of steps of the stop.

A method of preparing in advance a correction coefficient for correcting generated color crosstalk and correcting an image signal, as disclosed in Japanese Patent Laid-Open No. 10-271519, corrects an image signal by applying, to each color pixel, a gain for correcting a relative sensitivity difference caused by color crosstalk. When color crosstalk is large (sensitivity difference is large), a large gain needs to be applied. This may decrease the S/N ratio or degrade the image quality owing to overcorrection and undercorrection. When different gains are applied for respective, red, green, and blue pixel colors, the luminance value changes upon a change of a luminance composition ratio given by red:green:blue=3:6:1. Color crosstalk correction changes the exposure of an image to be captured.

For this reason, if the degree of color crosstalk changes owing to a change of the aperture value, the white balance coefficient needs to be obtained again. However, the techniques disclosed in Japanese Patent Laid-Open Nos. 2008-263492 and 11-194390 cannot correct color cast caused by color crosstalk for a frame image which undergoes white balance processing during a period until a white balance coefficient corresponding to a changed aperture value is obtained when the aperture value changes during moving image capturing.

SUMMARY OF THE INVENTION

The present invention has been made to overcome at least one of the conventional drawbacks, and provides an image processing apparatus capable of effectively correcting color crosstalk in a moving image by a simple method and an image processing method.

According to an aspect of the present invention, there is provided an image processing apparatus which performs white balance processing for a moving image obtained by capturing, by an image sensor, an object image formed by an imaging optical system, the apparatus comprising: a storage unit which stores white-detection area information available in correspondence with at least two parameters regarding the imaging optical system; a determination unit which sets a parameter regarding the imaging optical system; a calculation unit which calculates a first white balance coefficient using a frame image obtained using the parameter determined by the determination unit and a first white-detection area obtained from the white-detection area information in the storage unit in correspondence with the determined parameter; an estimating unit which calculates a second white balance coefficient using the frame image obtained using the parameter determined by the determination unit and a second white-detection area different from the first white-detection area, and corrects the second white balance coefficient using information about the first white-detection area to calculate an estimated white balance coefficient; an application unit which applies a white balance coefficient to a frame image contained in the moving image; and a control unit which, when a parameter regarding the imaging optical system changes, controls the application unit to apply the estimated white balance coefficient calculated by the estimating unit to a frame image contained in the moving image, and then apply the first white balance coefficient calculated by the calculation unit to a frame image contained in the moving image.

According to another aspect of the present invention, there is provided an image processing method of performing white balance processing for a moving image obtained by sensing, by an image sensor, an object image formed by an imaging optical system, the method comprising: a storage step of storing, in a storage unit, white-detection area information available in correspondence with at least two parameters regarding the imaging optical system; a determination step of setting a parameter regarding the imaging optical system; a calculation step of calculating a first white balance coefficient using a frame image obtained using the parameter determined in the determination step and a first white-detection area determined from the white-detection area information in the storage unit in correspondence with the determined parameter; an estimating step of calculating a second white balance coefficient using the frame image obtained using the parameter determined in the determination step and a second white-detection area different from the first white-detection area, and correcting the second white balance coefficient using information about the first white-detection area to calculate an estimated white balance coefficient; an application step of applying a white balance coefficient to a frame image contained in the moving image; and a control step of, when a parameter regarding the imaging optical system changes, controlling the application step to apply the estimated white balance coefficient calculated in the estimating step to a frame image contained in the moving image, and then apply the first white balance coefficient calculated in the calculation step to a frame image contained in the moving image.

With this arrangement, the present invention can provide an image processing apparatus capable of effectively correcting color crosstalk in a moving image by a simple method, a control method thereof, and an image-capturing apparatus.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
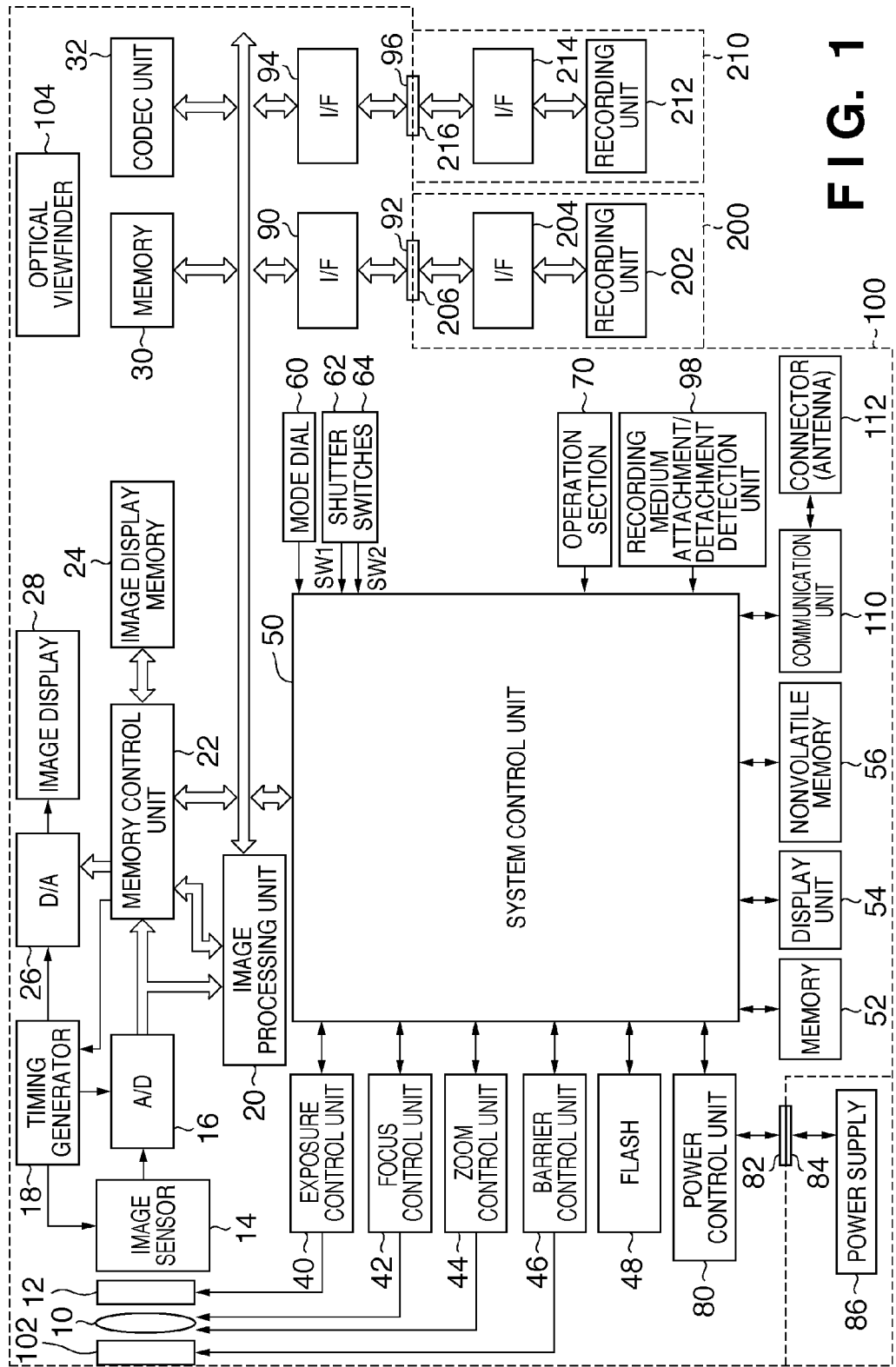
FIG. 1 is a block diagram exemplifying the functional arrangement of an image-capturing apparatus as an example of an image processing apparatus according to an embodiment of the present invention.

FIG. 1 is a block diagram exemplifying the functional arrangement of an image-capturing apparatus as an example of an image processing apparatus according to an embodiment of the present invention.

The image-capturing apparatus includes an imaging lens 10. A shutter 12 has a stop mechanism capable of changing the aperture value. The imaging lens 10 and shutter 12 form an imaging optical system. An image sensor 14 such as a CCD sensor or CMOS sensor senses an object image formed by the imaging optical system, and converts it into an electrical signal. An A/D converter 16 converts an analog image signal read out from the image sensor 14 into a digital image signal.

A timing generator 18 supplies clock signals and control signals to the image sensor 14, the A/D converter 16, and a D/A converter 26. A memory control unit 22 and system control unit 50 control the timing generator 18.

An image processing unit 20 performs predetermined pixel interpolation processing and color conversion processing for an image signal from the A/D converter 16 or one from the memory control unit 22.

The image processing unit 20 performs predetermined calculation processing using a captured image signal. Based on the obtained calculation result, the system control unit 50 controls an exposure control unit 40 and focus control unit 42 to implement TTL (Through The Lens) AF (Auto Focus), AE (Auto Exposure), and EF (Electronic Flash pre-emission) functions.

Further, the image processing unit 20 executes predetermined calculation processing using a captured image signal, and performs even TTL AWB (Auto White Balance) processing by applying the obtained calculation result (white balance coefficient) to the image signal. In white balance processing, the image processing unit 20 performs block integration to divide an image formed from captured image signals into a plurality of blocks and obtain the integral value of pixels belonging to each block for each color. The image processing unit 20 also executes white search integration to expand the value of each pixel into coordinates in the chromaticity space, and obtain the integral value of pixel values falling within a white-detection area defined in advance in the chromaticity space. Note that the image processing unit 20 stores the setting of the white-detection area in the chromaticity space used in white search integration.

The memory control unit 22 controls the A/D converter 16, the timing generator 18, the image processing unit 20, an image display memory 24, the D/A converter 26, a memory 30, and a codec unit 32.

An image signal output from the A/D converter 16 is written in the image display memory 24 or memory 30 via the image processing unit 20 and memory control unit 22, or directly via the memory control unit 22.

An image display unit 28 such as an LCD or organic EL display displays, via the D/A converter 26, display image data written in the image display memory 24. The image display unit 28 sequentially displays captured image signals, implementing an electronic viewfinder (EVF) function.

The image display unit 28 can also arbitrarily turn on/off the display in accordance with an instruction from the system control unit 50. Turning off the display can greatly reduce the power consumption of an image-capturing apparatus 100.

The memory 30 is a storage device which stores captured still images and moving images, and has enough storage capacity to store a predetermined number of still images or a moving image of a predetermined time. Even in continuous-image shooting or panoramic-image shooting for successively shooting a plurality of still images, many images can be quickly written in the memory 30.

The memory 30 is also available as a work area for the system control unit 50.

The codec unit 32 reads out an image stored in the memory 30, and performs well-known data compression or decompression processing using adaptive discrete cosine transform (ADCT), wavelet transform, or the like. The codec unit 32 writes the processed data in the memory 30.

The exposure control unit 40 controls the shutter 12 having the stop mechanism. In addition, the exposure control unit 40 provides even a flash light control function in cooperation with a flash 48. The exposure control unit 40 controls the stop mechanism of the shutter 12 by setting an aperture value for the shutter 12. The aperture value is determined based on an AE function implemented by the system control unit 50, and sent to the exposure control unit 40.

The focus control unit 42 controls focusing of the imaging lens 10. A zoom control unit 44 controls zooming of the imaging lens 10. A barrier control unit 46 controls the operation of a lens barrier 102 to protect the imaging lens 10.

The flash 48 functions as an auxiliary light source in image capturing. The flash 48 has even a light control function and AF auxiliary light projection function.

The exposure control unit 40 and focus control unit 42 are controlled using the TTL method. More specifically, the image processing unit 20 applies predetermined calculation to a captured image signal. Based on the calculation result, the system control unit 50 controls the exposure control unit 40 and focus control unit 42.

The system control unit 50 is, for example, a CPU, and controls the overall image-capturing apparatus 100 by executing a program stored in a memory 52. The memory 52 stores constants, variables, programs, and the like for the operation of the system control unit 50. The memory 52 also stores program charts used in AE control. The program chart is a table which defines the relationship between the control values of the stop aperture diameter (or aperture value) and shutter speed with respect to the photometric value (EV value).

A display unit 54 is formed from a combination of output devices such as an LCD, LED, and loudspeaker. The display unit 54 outputs an operating state, message, or the like using a text, image, sound, or the like in accordance with execution of a program by the system control unit 50. One or a plurality of display units 54 are arranged at easily recognizable positions near an operation unit 70 of the image-capturing apparatus 100. Part of the display unit 54 is set in an optical viewfinder 104.

A nonvolatile memory 56 is an electrically erasable/programmable memory and is, for example, an EEPROM.

A mode dial 60, shutter switches 62 and 64, and the operation unit 70 configure operation controls for inputting various operation instructions to the system control unit 50. These operation controls are formed from one or a combination of a button, switch, dial, touch panel, pointing based on line-of-sight detection, speech recognition device, and the like.

These operation controls will be explained in detail.

The mode dial 60 is a switch for switching and setting respective function modes such as power-off, automatic image shooting mode, programmed image shooting mode, panoramic-image shooting mode, playback mode, multi-window playback/erase mode, and PC connection mode.

The first shutter switch SW1 62 is turned on by pressing a shutter button (not shown) attached to the image-capturing apparatus 100 halfway (half stroke). Then, the system control unit 50 instructs associated blocks to start an operation such as AF (Auto Focus) processing, AE (Auto Exposure) processing, AWB (Auto White Balance) processing, or EF (Electronic Flash pre-emission) processing.

The second shutter switch SW2 64 is turned on by completing the operation of the shutter button (not shown) (full stroke), and designates the start of a series of processes including exposure processing, development processing, and recording processing. In exposure processing, an image signal read out from the image sensor 14 is written in the memory 30 via the A/D converter 16 and memory control unit 22. Further, development processing is done using calculation by the image processing unit 20 or memory control unit 22 under the control of the system control unit 50. In recording processing, an image signal having undergone development processing is read out from the memory 30, compressed by the codec unit 32, and written as an image file on a memory card 200 or 210.

The operation unit 70 is a user interface having operation members such as a switch, button, rotary dial switch, and touch panel. The operation unit 70 allows selecting an image recording mode, compression ratio, image quality, and the like for a captured image. In the embodiment, the operation unit 70 includes a moving image button which allows the user in the image shooting mode to designate the start/end of moving image capturing. However, the method of designating the start/end of moving image capturing is not particularly limited, and an arbitrary method can be adopted. For example, the user may select the moving image shooting mode with the mode dial 60, and designate the start/end of moving image capturing by turning on/off the second shutter SW2.

A power control unit 80 includes a battery detection circuit, a DC-DC converter, and a switching circuit for switching a block to be energized. The power control unit 80 detects loading/unloading of a battery, the type of battery, and the remaining battery level. The power control unit 80 controls the DC-DC converter based on the detection results and an instruction from the system control unit 50. The power control unit 80 applies a necessary voltage to respective units including the recording media 200 and 210 for a necessary period.

A power supply 86 is a primary battery (for example, an alkaline battery or lithium battery), a secondary battery (for example, an NiCd battery, NiMH battery, or Li battery), an AC adapter, or the like. The power supply 86 is attached to the image-capturing apparatus 100 via connectors 82 and 84.

The recording media 200 and 210 such as a memory card or hard disk include recording units 202 and 212 each formed from a semiconductor memory, magnetic disk, or the like, and interfaces 204 and 214 and connectors 206 and 216 with the image-capturing apparatus 100. The recording media 200 and 210 are mounted in the image-capturing apparatus 100 via the medium-side connectors 206 and 216 and the connectors 92 and 96 on the side of the image-capturing apparatus 100. The connectors 92 and 96 are connected to interfaces 90 and 94. A recording medium attachment/detachment detection unit 98 detects whether the recording media 200 and 210 are mounted.

In the embodiment, the image-capturing apparatus 100 includes two systems of interfaces and connectors for attaching a recording medium. However, single or arbitrary numbers of interfaces and connectors for attaching a recording medium can be arranged. Also, interfaces and connectors of different standards may be used for respective systems.

The lens barrier 102 covers an imaging unit including the imaging lens 10 in the image-capturing apparatus 100 to protect the imaging unit from dirt and damage.

The optical viewfinder 104 is, for example, a TTL viewfinder, and forms a beam having passed through the imaging lens 10 into an image using a prism or mirror. The use of the optical viewfinder 104 allows capturing an image without using an electronic viewfinder function on the image display unit 28. As described above, the optical viewfinder 104 displays information about some functions of the display unit 54, for example, focusing display, camera shake warning display, flash charge display, shutter speed display, aperture value display, and exposure correction display.

A communication unit 110 performs various communication processes including RS232C, USB, IEEE1394, P1284, SCSI, modem, LAN, and wireless communication processes.

A connector (antenna for wireless communication) 112 connects the image-capturing apparatus 100 to another device via the communication unit 110.

Figure 2:
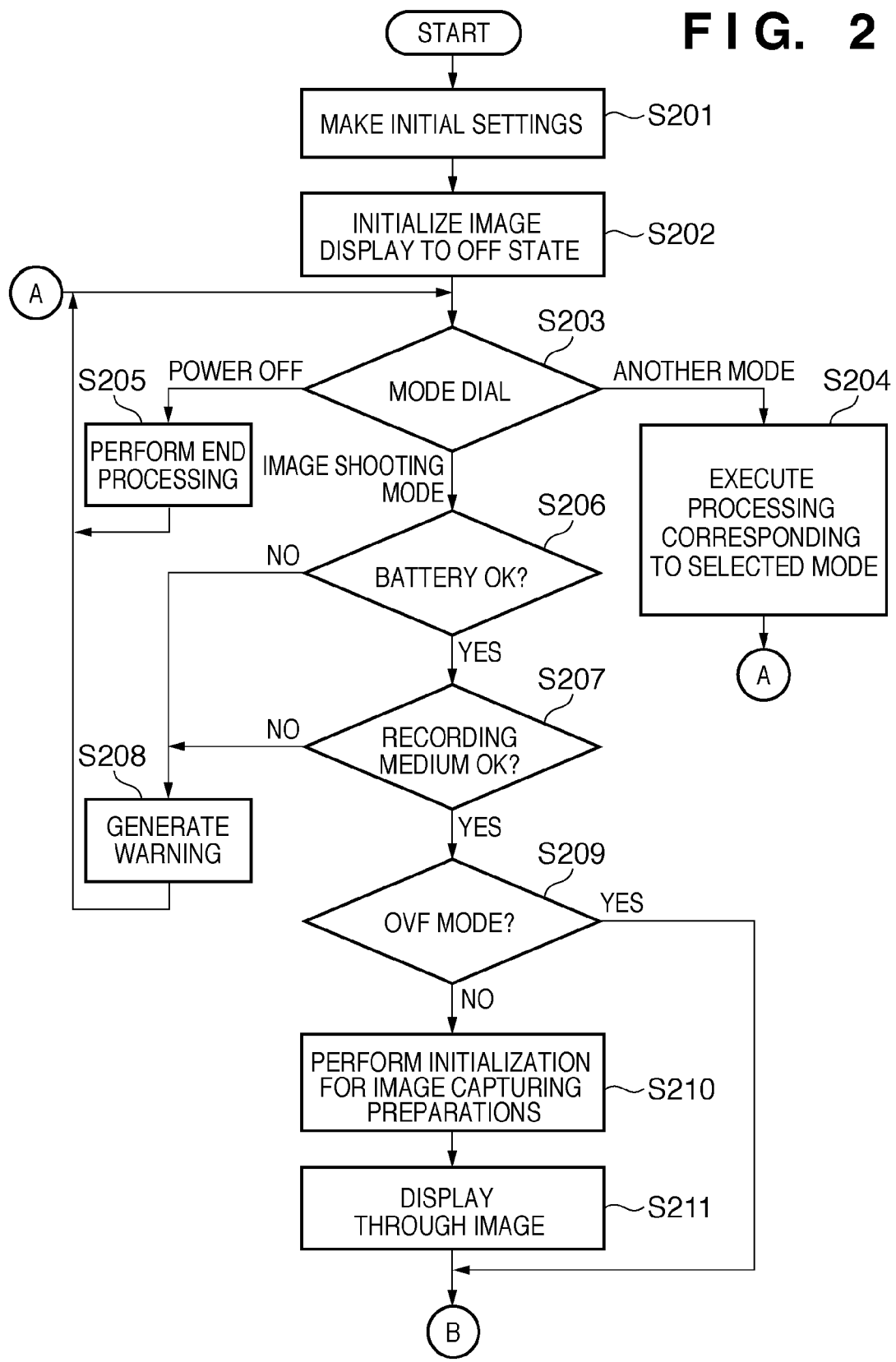
FIG. 2 is a flowchart for explaining the overall operation of the image-capturing apparatus according to the embodiment of the present invention.
Figure 3:
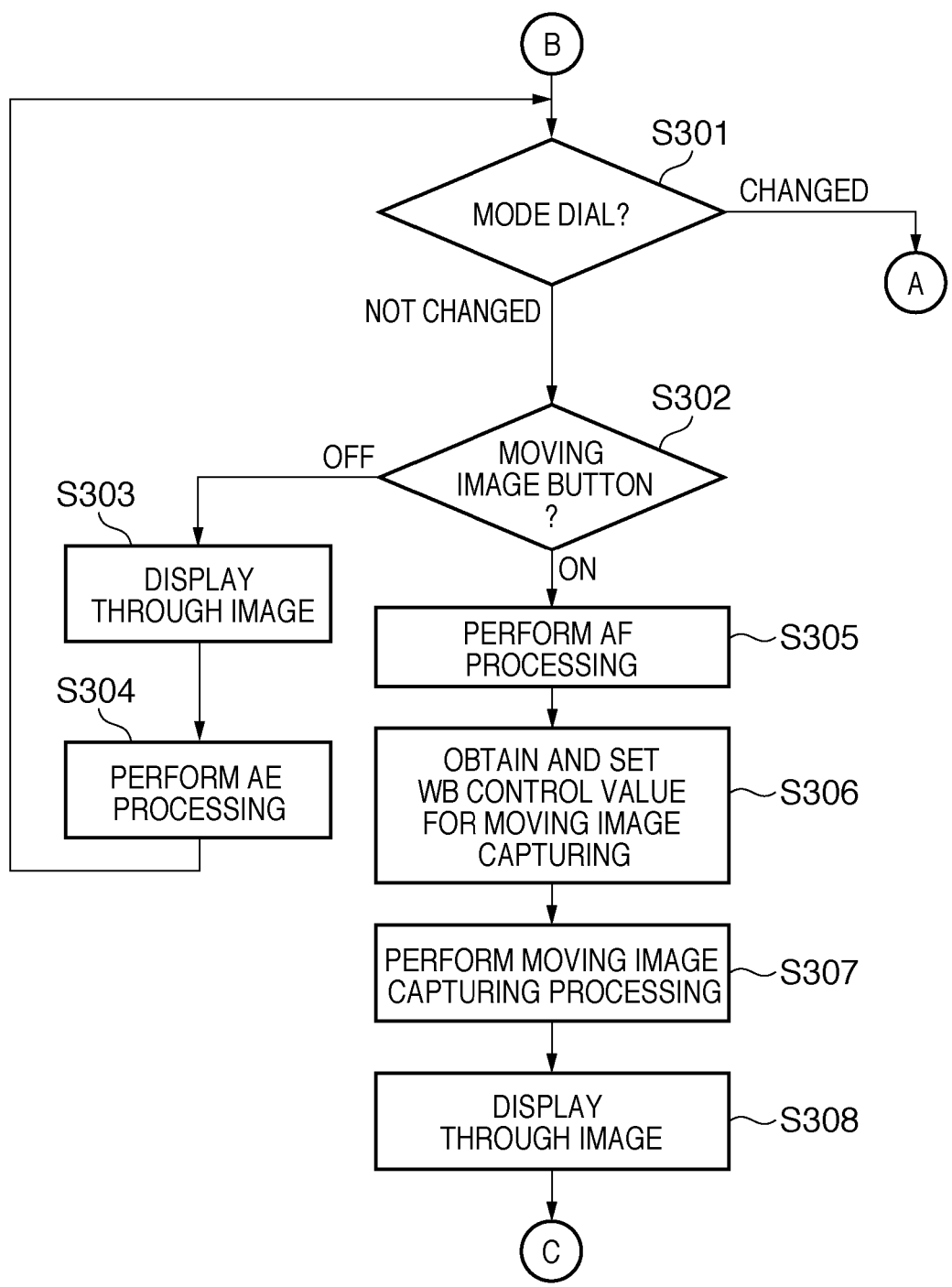
FIG. 3 is a flowchart for explaining the moving image recording start operation of the image-capturing apparatus according to the embodiment of the present invention.

The main operation of the image-capturing apparatus 100 will be explained with reference to FIGS. 2 to 5. FIGS. 2 and 3 are flowcharts for explaining the overall operation of the image-capturing apparatus 100.

When the image-capturing apparatus 100 is turned on by, for example, exchanging the battery, the system control unit 50 initializes flags, control variables, and the like (step S201), and initializes the image display of the image display unit 28 to an OFF state (step S202).

The system control unit 50 determines the set position of the mode dial 60. If the mode dial 60 is set to power-off (step S203), the system control unit 50 executes predetermined end processing (step S205), and then returns the process to step S203. For example, this end processing includes the following processes: processing of ending the display on each display unit, processing of closing the lens barrier 102, processing of recording parameters, set values, and a set mode including flags and control variables in the nonvolatile memory 56, and processing of stopping unnecessary power supply to the respective units of the image-capturing apparatus 100 including the image display unit 28 under the control of the power control unit 80.

If the mode dial 60 is set to another mode in step S203, the system control unit 50 executes processing corresponding to the selected mode (step S204), and returns the process to step S203.

If the mode dial 60 is set to the image shooting mode in step S203, the system control unit 50 controls the power control unit 80 to check the remaining capacity and operating state of the power supply 86 formed from a battery or the like (step S206). The system control unit 50 then determines whether the power supply 86 has a problem in the operation of the image-capturing apparatus 100. If the power supply 86 has a problem, the system control unit 50 displays a predetermined warning by an image or sound using the display unit 54 (step S208), and returns the process to step S203.

If the power supply 86 is proper (YES in step S206), the system control unit 50 determines whether the recording medium 200 or 210 has a problem in the operation of the image-capturing apparatus 100, especially in the recording/playback operation (step S207). If the recording medium 200 or 210 has a problem, the system control unit 50 displays a predetermined warning by an image or sound using the display unit 54 (step S208), and returns the process to step S203.

If the recording medium 200 or 210 is proper, the system control unit 50 determines in step S209 which of the OVF (Optical ViewFinder) mode and EVF (Electronic ViewFinder) mode is set. If the OVF mode is set, the system control unit 50 shifts the process to step S301 of FIG. 3 because no through image is displayed.

If the EVF mode is set, the system control unit 50 executes initialization processing in step S210 to cause the image display unit 28 to function as a viewfinder. More specifically, the system control unit 50 sets building components such as the image sensor 14, image processing unit 20, and memory control unit 22 necessary to generate a captured image for through display (through image), in a through image display state in which captured image signals are sequentially displayed. That is, the through image display state corresponds to moving image capturing for display.

Upon completion of image capturing preparations, the system control unit 50 starts capturing a moving image, and starts displaying a through image on the image display unit 28 (step S211).

In the through display state, the system control unit 50 sequentially displays, on the image display unit 28 via the memory control unit 22 and D/A converter 26, image signals which have been sequentially written in the image display memory 24 via the image sensor 14, A/D converter 16, image processing unit 20, and memory control unit 22. As a result, the image display unit 28 can function as an electronic viewfinder (EVF).

Figure 4:
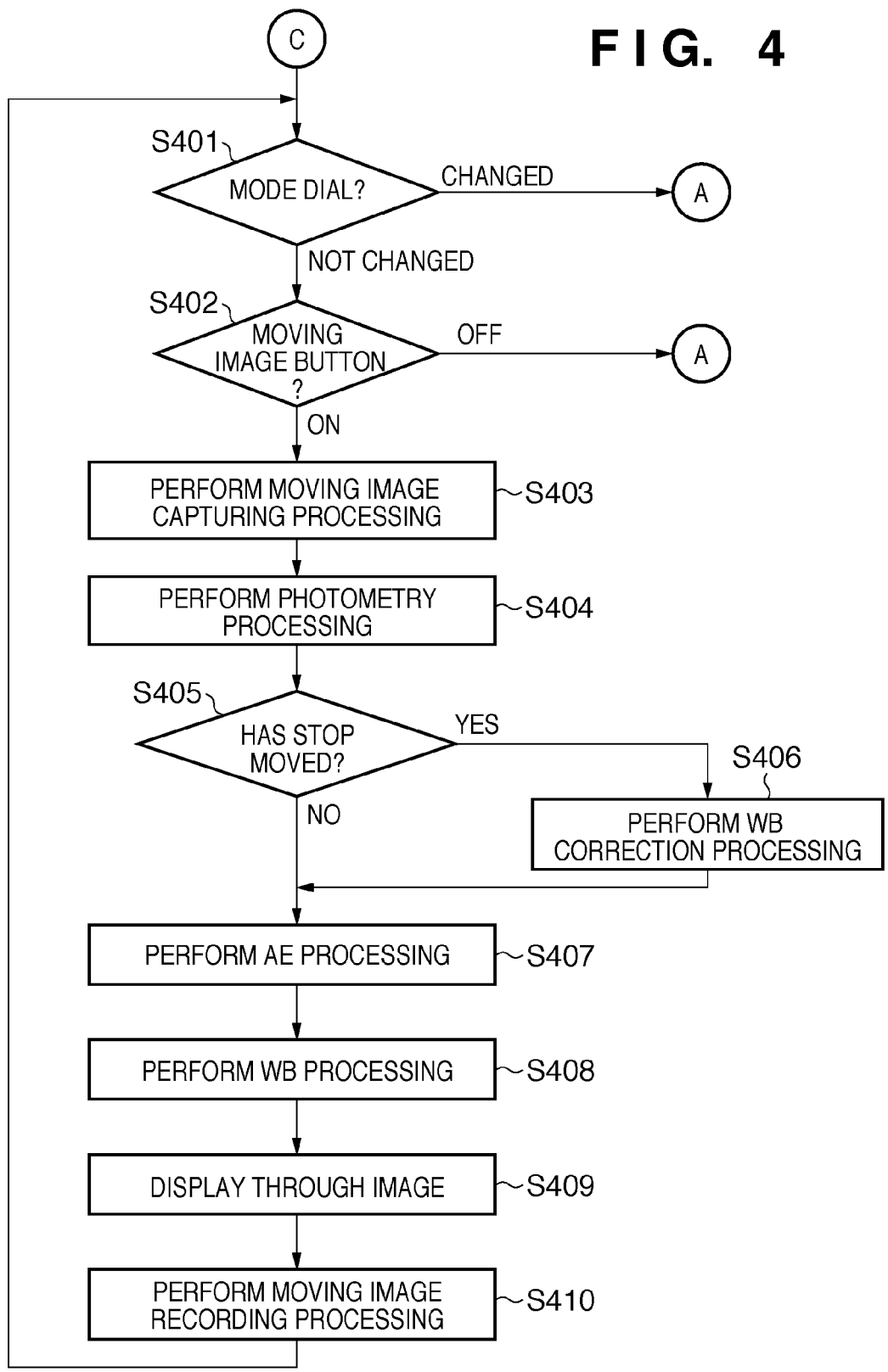
FIG. 4 is a flowchart for explaining the moving image capturing operation of the image-capturing apparatus according to the embodiment of the present invention.

An operation of capturing a moving image in the through image display state by the image-capturing apparatus 100 will be explained with reference to FIGS. 3 to 5.

First, an operation at the start of capturing a moving image by the image-capturing apparatus 100 will be explained with reference to FIG. 3. In step S301, the system control unit 50 determines whether the setting of the mode dial 60 has been changed. If the system control unit 50 detects a change of the setting, it returns the process to step S203, and performs processing corresponding to the state of the mode dial 60. If the setting of the mode dial 60 has not been changed, the system control unit 50 determines the state of the moving image button in step S302. If the moving image button is ON, the system control unit 50 advances the process to step S305; if it is OFF, to step S303. In the embodiment, the moving image button is a toggle switch which switches between the ON and OFF states every time it is pressed.

If the moving image button is OFF, the system control unit 50 performs predetermined processing to continue the through image display in step S303. The image processing unit 20 performs a predetermined photometry calculation for a signal obtained from the image sensor 14, and stores the calculation result in the memory 30. Based on the photometry calculation result, the system control unit 50 performs AE processing for through image capturing using the exposure control unit 40, and determines image capturing conditions such as the aperture value and shutter speed (step S304). The system control unit 50 then returns the process to step S301.

If the system control unit 50 determines in step S302 that the moving image button is ON, it performs AF processing in step S305. More specifically, the image processing unit 20 executes a predetermined focus calculation for a signal obtained from the image sensor 14, and stores the calculation result in the memory 30. Based on the focus calculation result, the system control unit 50 performs AF processing using the focus control unit 42, and adjusts the focus of the imaging lens 10 to an object.

In step S306, the system control unit 50 executes integration processing and a predetermined WB calculation using the image processing unit 20 for a signal obtained from the image sensor 14, obtaining a WB coefficient for moving image capturing. The system control unit 50 stores the moving image capturing WB coefficient in the memory 30, and sets it in the image processing unit 20.

In step S307, the system control unit 50 executes moving image capturing processing for one frame. After the image capturing processing, the memory 30 saves the image signal of a frame image before signal processing that has been read out from the image sensor 14 via the A/D converter 16. The system control unit 50 executes development processing using the image processing unit 20 for the image signal before signal processing. The development processing includes color interpolation processing and white balance processing. Depending on the recording format, encoding processing by the codec unit 32, generation of a recording file, and the like are also performed. The image signal having undergone development processing is saved as image data in the memory 30. The system control unit 50 writes the image data saved in the memory 30 as a moving image file in the recording medium 200.

In step S308, the system control unit 50 displays the frame image captured in step S307 as a through image on the image display unit 28, completing the moving image capturing start processing. After that, the system control unit 50 shifts to processing in FIG. 4.

Processing during moving image capturing processing in the image-capturing apparatus 100 will be explained with reference to the flowchart of FIG. 4. In step S401, the system control unit 50 checks whether the setting of the mode dial 60 has been changed. If the system control unit 50 detects a change of the setting, it returns the process to step S203, and performs processing corresponding to the state of the mode dial 60. If the setting of the mode dial 60 has not been changed, the system control unit 50 determines the state of the moving image button in step S402.

If the moving image button has been pressed again after the start of moving image capturing and is OFF, the system control unit 50 ends the moving image capturing processing, and returns the process to step S203.

If the moving image button has not been pressed after the start of moving image capturing and remains ON, the system control unit 50 advances the process to step S403 to continue moving image capturing processing.

In step S403, the system control unit 50 executes moving image capturing processing for one frame. By the moving image capturing processing, the memory 30 saves the image signal of a frame image before signal processing that has been read out from the image sensor 14 via the A/D converter 16.

In step S404, the system control unit 50 applies a predetermined photometry calculation for the image signal in the memory 30 using the image processing unit 20, and stores the calculation result in the memory 30.

In step S405, by referring to the photometry calculation result obtained in step S404, the system control unit 50 determines whether to change the aperture value out of current exposure set values including the electronic shutter speed and aperture value. This determination can be made by an arbitrary known method, for example, by using a predetermined program chart. If the system control unit 50 determines to change the aperture value, it obtains a target aperture value and advances the process to step S406. If the system control unit 50 determines not to change the aperture value, it advances the process to step S407.

In step S406, the system control unit 50 performs WB correction processing using the image processing unit 20. In WB correction processing, a change of the white balance upon a change of the aperture value is obtained by calculation. The system control unit 50 calculates a WB coefficient corresponding to the target aperture value using the image processing unit 20 based on the current WB coefficient stored in the memory 30, the current aperture value, the target aperture value, and correction information stored in advance in the nonvolatile memory 56. The corrected WB coefficient is set in the image processing unit 20 and stored in the memory 30. Note that details of the WB correction processing in step S406 will be described with reference to FIG. 6.

In step S407, the system control unit 50 performs AE processing using the exposure control unit 40 based on the photometry calculation result in step S404.

In step S408, the system control unit 50 performs WB processing using the image processing unit 20 based on a frame image. In step S408, the system control unit 50 controls the image processing unit 20 to execute either integration processing or calculation processing in WB processing. If no integration processing has been executed or the system control unit 50 determines in step S405 to move the stop, the system control unit 50 performs integration processing for WB processing to the image signal before signal processing that is stored in the memory 30.

More specifically, the image processing unit 20 divides a frame image formed from a captured image signal into a plurality of blocks. Then, the image processing unit 20 averages pixel values contained in a block for the respective colors to calculate color average values R[i], G[i], and B[i]. Further, the image processing unit 20 calculates color evaluation values Cx[i] and Cy[i] for each block using the following equations:

$$Cx[i]=(R[i]-B[i])/Y[i]\times 1024$$

$$Cy[i]=(R[i]+B[i]-2G[i])/Y[i]\times 1024$$

where Y[i]=R[i]+2G[i]+B[i], i=1 . . . m (m is a block count)

The image processing unit 20 determines that a block having color evaluation values Cx[i] and Cy[i] falling within a white-detection area corresponding to the target aperture value is a white block. The image processing unit 20 calculates integral values SumR, SumG, and SumB of red, green, and blue pixels contained in the white block (white search integration), and stores the result in the memory 30. Note that white-detection area information corresponding to the target aperture value may be stored in advance in the nonvolatile memory 56 or the like for each aperture value. Alternatively, each white-detection area may be calculated from white-detection area information corresponding to a given aperture value and a calculation equation prepared in advance.

The integration processing for a frame image takes some time. Thus, when performing the integration processing, the system control unit 50 advances the process to step S409 after the start of the integration processing without waiting for its end.

If the integration processing has been completed, the system control unit 50 executes WB calculation processing using the image processing unit 20.

The image processing unit 20 reads out the integration result from the memory 30, and calculates white balance coefficients WBCo_R, WBCo_G, and WBCo_B based on, for example, the following equations:

$$WBCo\_R=SumY\times 1024/SumR$$

$$WBCo\_G=SumY\times 1024/SumG$$

$$WBCo\_B=SumY\times 1024/SumB$$

where SumY=(SumR+2×SumG+SumB)/4

The image processing unit 20 sets the calculated moving image capturing white balance coefficients (white balance control values) in it, and also stores them in the memory 30.

In step S409, the system control unit 50 executes development processing using the image processing unit 20 for the unprocessed image data which has been captured in step S403 and stored in the memory 30 using the image processing unit 20. The development processing includes color interpolation processing and white balance processing. Depending on the recording format, encoding processing by the codec unit 32, generation of a recording file, and the like are also performed. The image signal having undergone development processing is saved as image data in the memory 30. The system control unit 50 displays a through image on the image display unit 28 using the image data.

In step S410, the system control unit 50 writes the image data saved in the memory 30 as a moving image file in the recording medium 200. The system control unit 50 returns the process to step S401 to continue moving image capturing processing.

Figure 5:
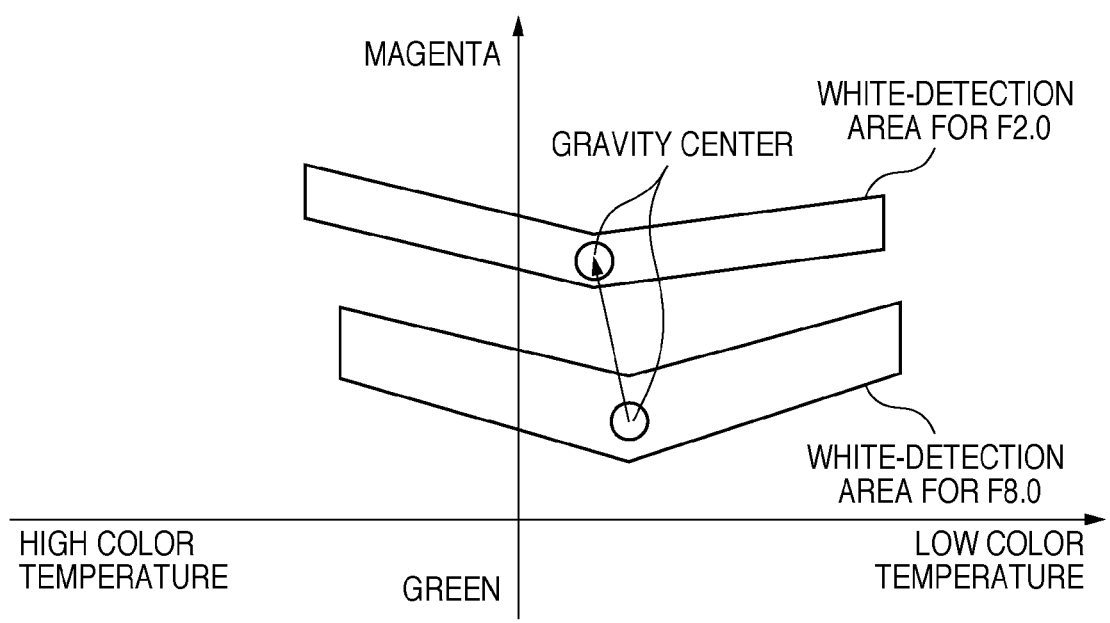
FIG. 5 is a graph exemplifying the relationship between the white-detection area and the aperture value that is set in the embodiment of the present invention.

FIG. 5 is a graph exemplifying the relationship between the white-detection area and the aperture value that is set in the embodiment.

In FIG. 5, the white-detection area is represented as an area in a chromaticity space where the color temperature axis and the magenta-green axis are perpendicular to each other. In the chromaticity space, the X-axis indicates the color temperature (color evaluation value Cx[i]), the positive direction is a low-color temperature side, that is, red direction, and the negative direction is a high-color temperature side, that is, blue direction. The Y-axis is the magenta-green axis (color evaluation value Cy[i]), the positive direction is the magenta direction, and the negative direction is the green direction.

As described above, the white-detection area defines an area where the color evaluation values of a white object exist under various light sources based on the blackbody radiation axis. The sensitivity of the color filter for each color changes depending on composite elements including the internal arrangement of the image sensor, the image capturing system such as the color filter, the lens structure, and the optical system such as the coating and filter. For this reason, the position and size of the white-detection area in the chromaticity space change. When light which obliquely enters the image sensor enters not only a predetermined pixel but also an adjacent pixel to generate color crosstalk, the color crosstalk state also changes depending on the incident angle of the beam. The angle of light incident on the image sensor, especially the maximum incident angle with respect to the optical axis depends on the aperture size. As the aperture is larger (aperture value or F-number is smaller), a larger quantity of beam obliquely enters the image sensor. Hence, the relative sensitivity of each color pixel depends on the aperture value. Even the position and size of the white-detection area in the chromaticity space depend on the aperture value.

As described above, the sensitivity to the wavelength of a color having high transmittance for a beam increases in a pixel of another color adjacent to a pixel of the color having high transmittance for a beam. Accordingly, the sensitivity of the pixel of the color having high transmittance for a beam relatively decreases. The spectral sensitivity characteristic of the image sensor changes between a case in which color crosstalk occurs and a case in which no color crosstalk occurs, and the color balance of an image also changes between these two cases. As the degree of color crosstalk becomes higher, the color balance changes more greatly. The embodiment executes the aforementioned white balance processing by setting a white-detection area to correct a change of the color balance caused by color crosstalk, thereby simply, effectively correcting color crosstalk in a captured image. More specifically, the white-detection area used in white balance processing for a captured image is dynamically set in accordance with the target aperture value obtained in step S405.

FIG. 5 exemplifies a white-detection area for F2.0 and that for F8.0. The transmittances and transmission wavelengths of red, blue, and green filters which form a color filter differ between F2.0 and F8.0. At F2.0, color crosstalk is large, the sensitivity in the blue direction increases, and that in the green direction decreases. To cancel this, the white-detection area extends in a high-color temperature direction and is positioned in the magenta direction (near magenta). In contrast, at F8.0, entrance of an oblique beam decreases compared to that at F2.0, and generation of color crosstalk is suppressed. Thus, the sensitivity in the magenta-green direction greatly changes, and at the same time, the sensitivity in the blue direction slightly changes.

More specifically, the spectral sensitivity characteristic changes due to color crosstalk, so the position of the blackbody radiation axis serving as the base of the white-detection area changes depending on the aperture value. The position of the white-detection area is therefore set in accordance with that of the blackbody radiation axis corresponding to the aperture value. When color crosstalk is large, color crosstalk caused by light which passes through a green color filter and then enters an adjacent blue or red pixel becomes relatively large. The color evaluation value near the green wavelength is highly likely to be incorrect. Thus, when the aperture value is small and color crosstalk is large, a detection area where the ratio of the green component contained in the white-detection area is set smaller than that for a small color crosstalk is set small.

The white balance change amount corresponding to the aperture value can be simply obtained from the motion vector of the gravity center of the white-detection area. The change amount can be used to correct the white balance change amount corresponding to the aperture value for a light source having a fixed-value white balance called a preset white balance, such as sunlight or a bulb.

In the embodiment, to simplify processing, a white-detection area for F2.0 is used in a full-aperture state, and a white-detection area for F8.0 is used at small apertures of F8.0 or more. White-detection areas corresponding to aperture values (for example, F4.0 and F5.6) between the full and small apertures may be prepared in advance, or obtained from the detection areas for F2.0 and F8.0 according to a method such as linear interpolation or linear transformation. When the image-capturing apparatus 100 is of a lens interchangeable type, the color crosstalk characteristic changes depending on even the lens diameter. In this case, pieces of white-detection area information corresponding to a lens can also be stored for a plurality of aperture values.

Figure 6:
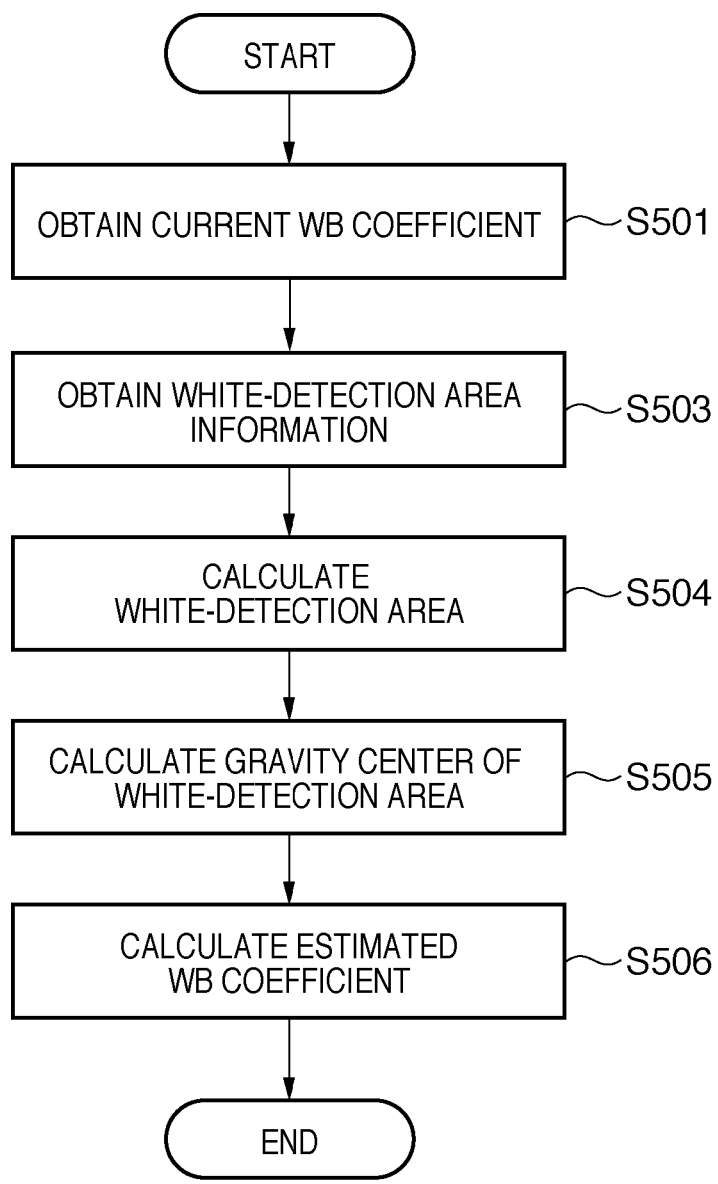
FIG. 6 is a flowchart for explaining the estimated white balance coefficient calculation operation of the image-capturing apparatus according to the embodiment of the present invention.

FIG. 6 is a flowchart for explaining an operation of correcting the white balance coefficient in step S406.

In step S501, the system control unit 50 obtains the currently used white balance coefficient and an aperture value (current aperture value) used when the white balance coefficient was obtained.

In step S503, the system control unit 50 obtains information which is stored in the nonvolatile memory 56 and defines a white-detection area.

In the embodiment, the nonvolatile memory 56 stores only pieces of information (and corresponding gravity center positions) which define white-detection areas corresponding to F2.0 and F8.0 out of aperture values settable for the shutter 12. In step S503, the system control unit 50 reads out, from the nonvolatile memory 56, pieces of information which define white-detection areas corresponding to F2.0 and F8.0, and stores them in the memory 30.

In step S504, the system control unit 50 obtains a white-detection area corresponding to the current aperture value, and a white-detection area corresponding to the target aperture value. If the current aperture value is a value falling within the range of F2.0 to F8.0, the system control unit 50 obtains a corresponding white-detection area by interpolation calculation using the pieces of information which define white-detection areas for F2.0 and F8.0. Even if the target aperture value is a value falling within the range of F2.0 to F8.0, the system control unit 50 obtains a corresponding white-detection area in the same way. The system control unit 50 stores, in the memory 30, pieces of white-detection area information obtained by interpolation calculation. Needless to say, if the current aperture value or target aperture value is F2.0 or F8.0, no interpolation calculation is necessary for this aperture value.

In step S505, the system control unit 50 calculates the gravity center of the white-detection area corresponding to the current aperture value and that of the white-detection area corresponding to the target aperture value. The gravity center is obtained as coordinates in the chromaticity space. When the gravity center of the detection area has already been calculated as a design value, even the gravity center position has been stored in the nonvolatile memory 56 at that time, and no recalculation is necessary.

In step S506, the system control unit 50 calculates the motion vectors of the gravity centers of the white-detection areas corresponding to the current aperture value and target aperture value. Based on the moving amounts of the gravity center in the color temperature direction and magenta-green direction, the system control unit 50 corrects the current white balance coefficient. More specifically, the system control unit 50 corrects the white balance coefficient such that a white pixel detected in the white-detection area corresponding to the target aperture value is corrected to be white. The system control unit 50 sets the corrected white balance coefficient in the image processing unit 20 as an estimated white balance coefficient used until a white balance coefficient based on the color evaluation value is calculated. Also, the system control unit 50 stores the estimated white balance coefficient in the memory 30.

The estimated white balance coefficient can be calculated by correcting the current white balance coefficient by calculation based on the change amount (moving amount) between the gravity center position of a white-detection area corresponding to the current aperture value and that of a white-detection area corresponding to the target aperture value. The estimated white balance coefficient can be used from development processing for the first image captured at a changed (target) aperture value, unlike a white balance coefficient obtained by white balance coefficient resetting processing based on integration processing described above. The estimated white balance coefficient is lower in accuracy than the reset white balance coefficient, but has an effect of correcting the influence of color crosstalk caused by a change of the aperture value. Development processing is executed using the estimated white balance coefficient until the white balance coefficient is obtained from an image captured after changing the aperture value. This can suppress the influence of color cast.

Figure 7:
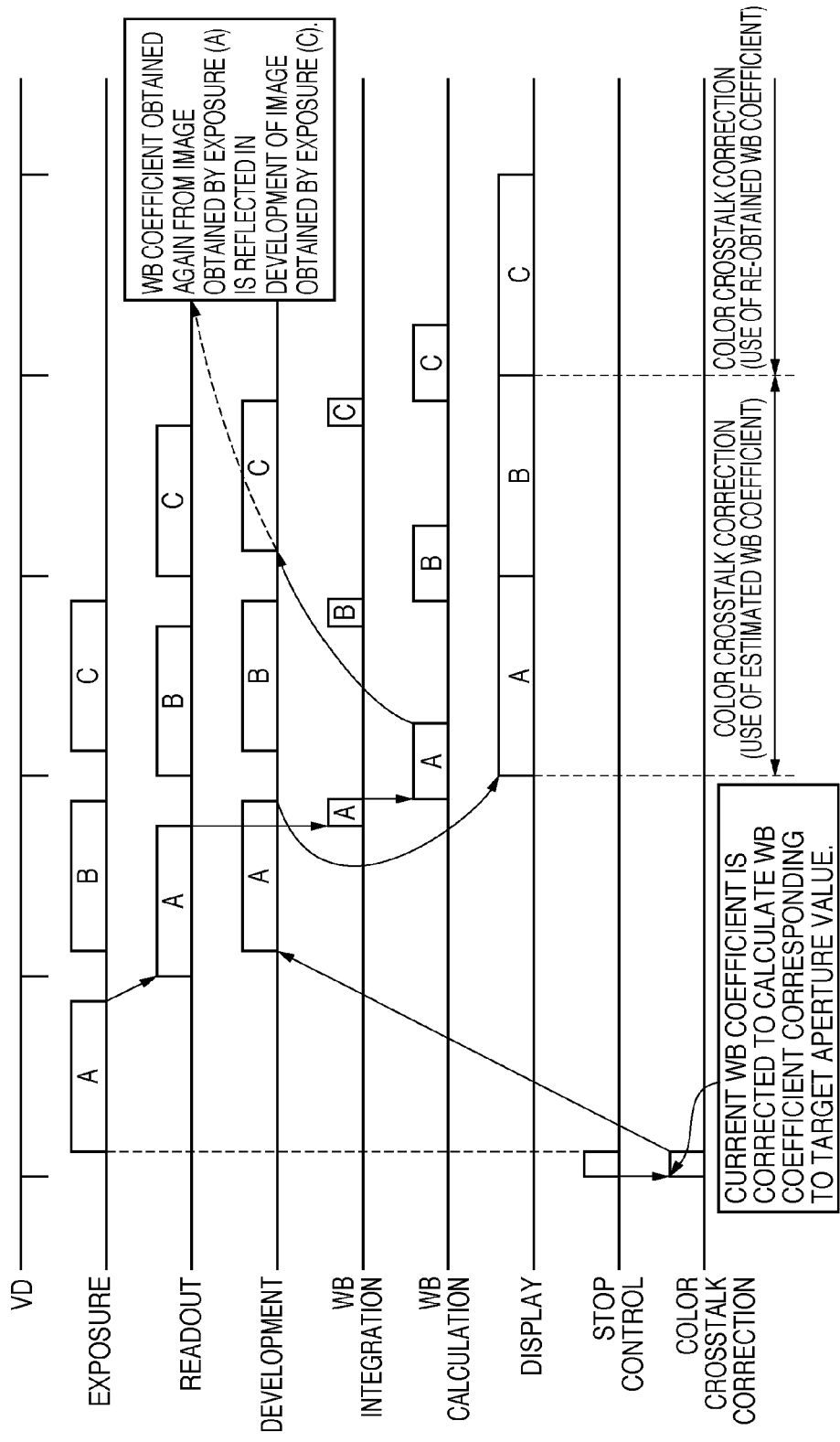
FIG. 7 is a timing chart of the image-capturing apparatus according to the embodiment of the present invention.

FIG. 7 is a timing chart exemplifying the processing timings of image processing for an image signal and stop control in the image-capturing apparatus 100 according to the embodiment.

In FIG. 7, VD represents a vertical sync signal, and is used as the basis of exposure and readout timings. The period of the vertical sync signal is sometimes called a VD period. In exposure operation A, charges (image signal) stored in the image sensor 14 are read out in the next VD period. Image signal A A/D-converted at the same time as readout undergoes development processing A parallelly to the readout operation with a short delay from the start of readout. Display image data A generated by development processing is displayed in the second next VD period.

After the end of reading out the image signal, WB integration A is executed. Upon completion of WB integration A, WB calculation processing A is executed to set a WB coefficient in the image processing unit 20. The set WB coefficient is applied when the image processing unit 20 executes the next development processing.

In the example of FIG. 7, development processing B for image signal B of the next frame has already started when WB calculation A is completed. Thus, the WB coefficient calculated by WB calculation A cannot be reflected in development processing for image signal B. The WB coefficient calculated by WB calculation A is reflected in development processing for image signal C. That is, two VD periods are taken for processing of resetting the white balance by WB integration processing and WB calculation processing.

To the contrary, in aperture value control, driving of the stop starts immediately after the start of the vertical sync period, and an aperture value after control is reflected in immediately subsequent exposure operation A. Hence, a change of the color crosstalk state upon a change of the aperture diameter of the stop affects an image captured immediately after changing the aperture value.

In the embodiment, as described with reference to FIG. 6, when changing the aperture value based on the photometry processing result, a target aperture value is obtained to correct the current WB coefficient. Then, an estimated WB coefficient corresponding to the target aperture value is calculated and set in the image processing unit 20. This correction processing requires neither image signal integration processing nor calculation processing based on the integral value. The estimated WB coefficient can therefore be applied to development processing A for image signal A obtained by image capturing processing A which reflects a change of the aperture value.

The embodiment implements color crosstalk correction by performing development processing using an estimated WB coefficient obtained by correcting the current WB coefficient in accordance with the target aperture value for an image signal captured until the WB coefficient is obtained again after changing the aperture value. Once the aperture value is changed, even WB coefficient obtaining processing is done for an image captured at the changed aperture value. Immediately after the white balance is obtained, it is used. After that, higher-accuracy color crosstalk correction becomes possible.

As described above, according to the embodiment, when the aperture value is changed during moving image capturing while color crosstalk occurs depending on the aperture value, the white balance coefficient is obtained again. Until the re-obtainment is completed, an estimated white balance coefficient obtained by correcting the current white balance coefficient in accordance with the change of the aperture value is used. Color crosstalk can therefore be corrected even for an image captured before the completion of obtaining a white balance coefficient again after changing the aperture value.

Note that the embodiment has described a method of suppressing color cast caused by color crosstalk along with aperture control during moving image recording. However, this method is applied not only during moving image recording, but also to EVF moving image capturing executed in a moving/still image capturing standby state. That is, the method is applicable to a case in which white balance control corresponding to aperture control is required.

Modification

In the above-described embodiment, immediately when the target aperture value is determined, the aperture value is changed to the target one. However, the aperture value may be changed stepwise to the target one when smoothly changing the aperture value, or when, for example, the maximum change amount of the aperture value in one VD period is limited.

In this case, an estimated white balance coefficient can be calculated stepwise at the start of each VD period, and the white balance coefficient re-obtaining operation can start after the start of image capturing at the target aperture value.

For example, when the current aperture value is F2.0, the target aperture value is F8.0, and the maximum change amount of the aperture value in one VD period is one step, the aperture value is changed from F2.0 to F4.0 before exposure in the first VD period. Then, an estimated white balance coefficient for F4.0 is obtained and applied to the frame image of a moving image captured at F4.0. Before exposure in the next VD period, the aperture value is changed from F4.0 to F8.0, and an estimated white balance coefficient for F8.0 is obtained and applied to the frame image of a moving image captured at F8.0. Also, white balance coefficient re-obtaining processing starts for the frame image of a moving image captured at F8.0.

In some cases, the coefficient is to be switched as smoothly as possible even at a timing when the white balance coefficient can be obtained again after estimation as in the embodiment. In this case, in a predetermined period after this timing, the white balance coefficient may be changed gradually to the re-obtained one using a coefficient obtained by weighting the estimated and re-obtained white balance coefficients.

The present invention has been explained regarding a specific embodiment. However, the above-described embodiment is merely an example to aid the understanding of the present invention, and does not limit the invention. It will readily occur to those skilled in the art that various changes and modifications are applicable to the above-described embodiment without departing from the scope of the invention.

For example, the above-described embodiment has explained a case in which the image processing apparatus according to the present invention is applied to an image-capturing apparatus, but the image capturing and recording functions are not indispensable for the present invention. The present invention can be practiced in an arbitrary device having a function of processing an image captured by an image sensor having a color filter. For example, the present invention is applicable to a cell phone, a PDA (Personal Digital Assistant), various information devices having a camera function, and an information processing apparatus capable of loading and processing captured image data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-108679, filed on May 10, 2010, which is hereby incorporated by reference herein its entirety.

What is claimed is:

1. An image processing apparatus which performs white balance processing for a moving image obtained by capturing, by an image sensor, an object image formed by an imaging optical system including a stop mechanism capable of changing an aperture value, the apparatus comprising:

a storage unit which stores white-detection area information available in correspondence with at least two aperture values;
a determination unit which determines an aperture value;
a calculation unit which calculates a first white balance coefficient using a frame image obtained using the aperture value determined by said determination unit and a first white-detection area obtained from the white-detection area information in said storage unit in correspondence with the determined aperture value;
an estimating unit which calculates a correction amount using the first white detection area and a second white-detection area different from the first white-detection area, and corrects the first white balance coefficient using the calculated correction amount to calculate an estimated white balance coefficient;
an application unit which applies a white balance coefficient to a frame image contained in the moving image; and
a control unit which, when an aperture value determined by the determination unit changes, controls said application unit to apply the estimated white balance coefficient calculated by said estimating unit to a frame image contained in the moving image, and then apply the first white balance coefficient calculated by said calculation unit to a frame image contained in the moving image, wherein
said storage unit stores gravity center positions in a chromaticity space of white-detection areas corresponding to the at least two aperture values as the white-detection area information, and
said estimating unit calculates a motion vector between a gravity center position of a white-detection area corresponding to an aperture value before the change and a gravity center position of a white-detection area corresponding to an aperture value after the change, and corrects a current white balance coefficient based on moving amounts of the gravity center position in a color temperature direction and a magenta-green direction to calculate the estimated white balance coefficient.

2. An image processing method of performing white balance processing for a moving image obtained by sensing, by an image sensor, an object image formed by an imaging optical system including a stop mechanism capable of changing an aperture value, the method comprising:

a storage step of storing, in a storage unit, white-detection area information available in correspondence with at least two aperture values;
a determination step of setting an aperture value;
a calculation step of calculating a first white balance coefficient using a frame image obtained using the aperture value determined in the determination step and a first white-detection area determined from the white-detection area information in the storage unit in correspondence with the determined aperture value;
an estimating step of calculating a correction amount using the first white detection area and a second white-detection area different from the first white-detection area, and correcting the first white balance coefficient using the calculated correction amount to calculate an estimated white balance coefficient;
an application step of applying a white balance coefficient to a frame image contained in the moving image; and
a control step of, when an aperture value determined in the determination step changes, controlling the application step to apply the estimated white balance coefficient calculated in the estimating step to a frame image contained in the moving image, and then apply the first white balance coefficient calculated in the calculation step to a frame image contained in the moving image, wherein said storage unit stores gravity center positions in a chromaticity space of white-detection areas corresponding to the at least two aperture values as the white-detection area information, and said estimating step calculates a motion vector between a gravity center position of a white-detection area corresponding to an aperture value before the change and a gravity center position of a white-detection area corresponding to an aperture value after the change, and corrects a current white balance coefficient based on moving amounts of the gravity center position in a color temperature direction and a magenta-green direction to calculate the estimated white balance coefficient.

3. A non-transitory computer-readable recording medium recording a program for causing a computer to function as each unit of an image processing apparatus defined in claim 1.

* * * * *